(12) United States Patent
Park et al.

(10) Patent No.: US 12,461,963 B1
(45) Date of Patent: Nov. 4, 2025

(54) METHOD FOR RETRIEVING IMAGES SIMILAR TO A GIVEN QUERY IMAGE FROM A SET CONTAINING IMAGES WITH MIXED DOMAIN CHARACTERISTICS BY APPLYING DEEP LEARNING TECHNOLOGY

(71) Applicant: vitasoft co. ltd., Seoul (KR)

(72) Inventors: Jae Yoon Park, Seoul (KR); Jae Yong Lee, Seoul (KR); Soon Kee Hong, Seoul (KR)

(73) Assignee: U.CUBE Co., Ltd., Seoul (KR)

( * ) Notice: Subject to any disclaimer, the term of this patent is extended or adjusted under 35 U.S.C. 154(b) by 0 days.

(21) Appl. No.: 18/955,995

(22) Filed: Nov. 22, 2024

(51) Int. Cl.
*G06F 16/00* (2019.01)
*G06F 16/532* (2019.01)
*G06F 16/55* (2019.01)

(52) U.S. Cl.
CPC ............ *G06F 16/532* (2019.01); *G06F 16/55* (2019.01)

(58) Field of Classification Search
CPC ....................................................... G06F 16/55
See application file for complete search history.

(56) References Cited

U.S. PATENT DOCUMENTS

2025/0165522 A1* 5/2025 Priya ....................... G06T 7/194

FOREIGN PATENT DOCUMENTS

KR    10-2024-0096290 A    6/2024

* cited by examiner

*Primary Examiner* — Ajith Jacob
(74) *Attorney, Agent, or Firm* — Insight Law Group, PLLC; Seung Lee

(57) ABSTRACT

The present invention relates to an image retrieving method for identifying images similar to an image of a particular object among images with differing domain characteristics, such as drawing images for an object or photographs images taken of the object.

5 Claims, 6 Drawing Sheets

METHOD FOR RETRIEVING IMAGES SIMILAR TO A GIVEN QUERY IMAGE FROM A SET CONTAINING IMAGES WITH MIXED DOMAIN CHARACTERISTICS BY APPLYING DEEP LEARNING TECHNOLOGY

BACKGROUND

1. Field of the Invention

The present invention relates to an image retrieving method for identifying images similar to an image of a particular object among images with differing domain characteristics, such as drawing images for an object or photographs images taken of the object.

Specifically, this invention relates to an image retrieving method that utilizes a trained artificial neural network model to retrieve across image groups with differing domain characteristics. For example, between a group of real product photographs and a group of drawing images, the model can retrieve a drawing of a product when a real product photo is input, or conversely, locate a real-world product photo representing the productized version of an input drawing. Such a retrieving can be applied in cases such as retrieving registered design rights images.

2. Discussion of Related Art

With advancements in deep learning technology, image retrieval techniques that use deep learning capabilities of artificial neural networks composed of convolutional neural networks (CNNs) are now widely utilized for similar image retrieving. According to conventional image retrieval techniques, feature vectors are pre-extracted from images to be retrieved using neural networks like CNNs and stored in a vector database. When a user inputs a query image, the system extracts a feature vector from the query image using the same neural network, then calculates similarity between the extracted feature vector and those stored in the vector database. The retrieving results are then presented in order of similarity. For similarity comparison between feature vectors, methods such as cosine similarity and Euclidean distance calculations are commonly used.

However, when the query image and target image differ significantly in formal characteristics (domain characteristics), issues may arise. For example, if the query image is a real photograph but the target image is a drawing depicting the same object, the differing domain characteristics between real images and drawings cause the similarity score between the feature vectors extracted by neural networks, such as CNNs, to be very low (or vice versa). As a result, although a human with abstract reasoning abilities can easily recognize both images as representing the same object, the AI retrieving system fails to determine the similarity between them.

FIG. 1 illustrates an example of a drawing image attached to a design application and a photo image of the real product embodying the design right. As shown in FIG. 1, although both images essentially represent the same product, the drawing image in the application is in a sketch format, while the product image distributed in the real world is in a photographic format. Since the two image groups have different domain characteristics, their formal properties differ, and consequently, the feature vectors generated by a CNN from each domain also vary significantly. Therefore, when assessing the similarity between the feature vectors of the two images, the similarity score is not as high as expected.

In reviewing the drawings attached to actual design applications, it is evident that the formats are highly diverse, including drawing images, computer-generated graphics, and real photographs. Therefore, when images with differing domain characteristics are intermixed, the retrieving results often fall short of expectations, resulting in a significant decrease in the reliability of the retrieving.

To address these issues, various studies on 'Sketch-Based Image Retrieval' are being conducted to enable the retrieving of real photographs based on sketched drawing images.

A well-known technique, introduced by Patsorn Sangkloy et al. in 2016, involves creating a dataset by collecting sketches drawn directly by crowd workers who reference real photographs. Based on this dataset, a convolutional neural network (CNN) is trained on both real photograph images and sketch images. This allows the system to return a corresponding real photograph when a sketch image is inputted (Patsorn Sangkloy et al., 2016).

Furthermore, research efforts have continued to improve performance by reducing the domain gap between real photographs and sketches. Among these, some approaches use generative models to generate a sketch from a real photograph (Ayan Kumar Bhunia et al., 2021) or, conversely, to generate a real photograph from a sketch, thereby narrowing the domain gap.

The inventors of the present invention completed this invention by reversing the task of sketch-based image retrieval. They developed a training method for an AI model that, when a real product photo is inputted, can find and return the corresponding sketch or drawing image of the product. Furthermore, this invention can also be applied in reverse, such that when a drawing image is inputted, the system retrieves the corresponding real product photograph.

SUMMARY OF THE INVENTION

The present invention aims to address the aforementioned conventional issues by applying deep learning technology to locate intellectual property rights (patent, trademark, design rights) associated with real-world products. It is designed to resolve problems arising from domain characteristic differences between images in the process of assessing similarity between a specific real-world photograph and drawing images attached to intellectual property registration applications.

The advantages of this invention include enabling anyone to easily locate intellectual property rights (patents, trademarks, design rights) specified by sketch images simply by obtaining a real-world photograph of a particular item. Furthermore, it allows for easier determination of potential infringement on intellectual property rights for suspected infringing items. Additionally, it enhances the accuracy of comparing previously registered drawing information with the image information of items at the time of new intellectual property application and examination, thereby improving the efficiency of similarity assessment in the application and examination process.

To achieve the objectives described above, the present invention provides an image comparison and retrieving method comprising the following steps:

A first step of generating a feature vector database for multiple target drawing images, where each image is processed by a first convolutional neural network (CNN) to create target feature vectors.

A second step of generating a query feature vector from a real-world photograph obtained by capturing a real object using a second convolutional neural network.

A third step of retrieving the target feature vector database for vectors most similar to the query feature vector generated from the query image.

The method further includes:

A generative model 12 that creates a feature vector from a specific drawing image 11 and a discriminative model 30 that identifies differences between the feature vector 13 extracted from the specific design drawing 11 and those extracted from real product photograph images 21, 31, 41.

The generative model 12 iteratively adjusts the creation of the feature vector until the discriminative model 30 finds it challenging to distinguish the generated feature vector 13 from other vectors 23, 33, 43 in the same image cluster. The discriminative model 30 performs adversarial training by maximizing its ability to distinguish feature vectors extracted from multiple design drawings 11 from those extracted from real product photograph image of the items depicted in those drawings 21, 31, 41.

This process includes an additional feature vector generation step to ensure that feature vectors of the same cluster group are created through adversarial training, enhancing the accuracy of similarity comparison between drawing images and real product photograph images.

By Applying this approach, the feature vectors generated by the adversarial learning network gain certain common characteristics within the same clustering image group, even when domains differ, such as between the feature vector of a drawing image and that of a real product photograph representing the drawing. Consequently, the model acquires the ability to identify similarities by minimizing differences between feature vectors within the same clustering image group, despite domain differences. Additionally, using the adversarial learning method enhances the classification capability of the discriminative model, which, in turn, improves the performance of the generative model undergoing adversarial training.

According to another embodiment of the present invention, an image retrieving method is provided that further includes an image vector clustering training step S100, wherein feature vectors are generated from images representing the same object but having different domains and grouped into a single identical cluster group. Within this cluster group, training is conducted to enhance the similarity among the included feature vectors, while also training to increase the distinction between feature vectors belonging to different cluster groups.

By providing such an invention, it becomes possible to judge images that generate feature vectors within the same cluster as identical, even when the domains differ, and to perform training in a manner that learns the distinction from other clusters.

In particular, the image vector clustering training step sets a triplet learning dataset based on the image vector clusters. This step executes similarity training to determine that images generating feature vectors within the same cluster represent the same object, even if they belong to different domains. This is a key feature of the image retrieving method provided by the invention.

By providing this invention, when conducting similarity training using a triplet learning dataset, images that represent the same object but have different domain characteristics due to formal differences can be grouped into a single feature vector cluster. This allows the model to learn to distinguish this cluster from those of other objects. Additionally, within the same cluster, the model enhances its ability to recognize similarity among feature vectors, while improving its capability to differentiate them from vectors in other clusters, thereby increasing the performance of image retrieving.

According to the present invention, the design drawing image is specifically a drawing image attached to a design patent application. As a result, it becomes possible to achieve improved performance in locating design patent by simply photographing the real product embodying the design patents According to the present invention, wherein the real product photograph query image is a real product photograph image obtained by capturing a product that is in the customs clearance process. As a result, it has become possible to easily and accurately verify potential violations of design rights using real photographs obtained from the customs clearance inspection site of the Customs Agency.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Below, with reference to the attached drawings, the technical configuration of the present invention will be explained through examples so that a person of ordinary skill in the relevant technical field can easily implement it. The embodiments of the present invention will be described in detail.

This embodiment is described as a single example and is not intended to limit the scope of the present invention. Therefore, it can be modified and implemented in various forms within the scope of the present invention, and the scope of the invention equally applies to such modified embodiments.

I will explain the creation of a deep learning model to retrieve for drawing images similar to real photograph images based on those real photographs. The first step is the collection of training data to be used for deep learning.

Figure 1:
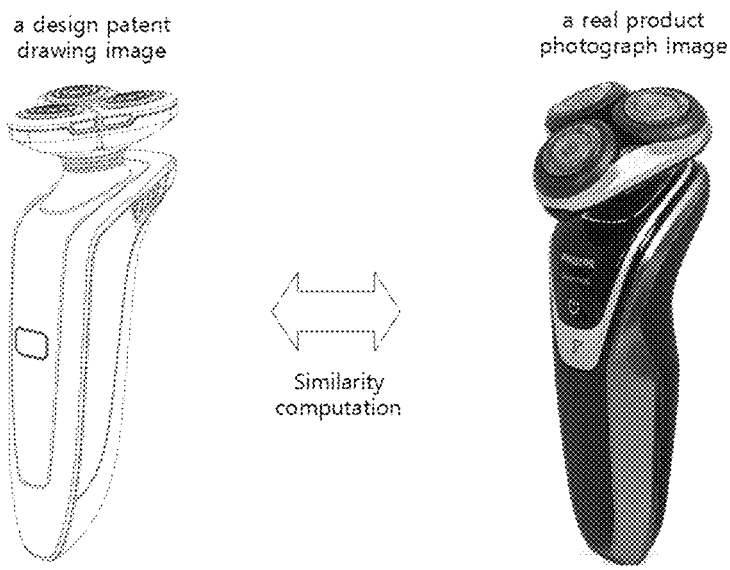
FIG. 1 is an illustration showing examples of a design patent drawing image and a real product photograph.
Figure 2:
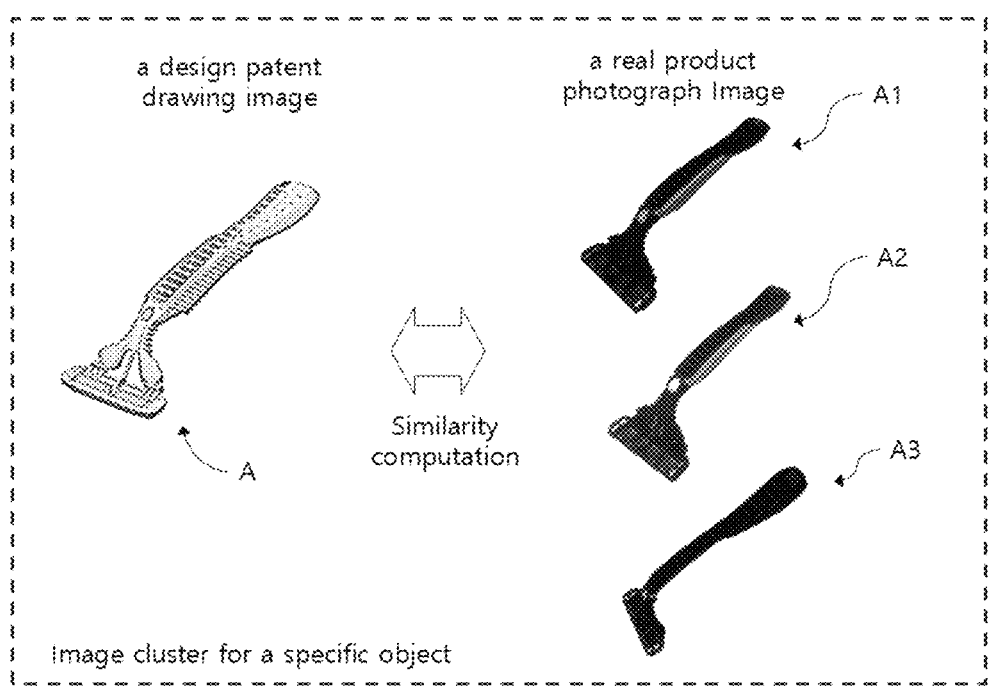
FIG. 2 is an illustration from an embodiment of the present invention, depicting a case where multiple real product photos are generated from one drawing image to create an image cluster.

As shown in FIG. 2, a drawing of the design patent corresponding to the real product was obtained, and photograph images of the real product was captured to match the composition of the drawing. In this case, to enhance the robustness of the model, it is beneficial to collect photograph images of the real product taken against various backgrounds.

In the stage of collecting training data, it must be taken into account that obtaining product images that embody the design patent is challenging. Therefore, a crowd-sourcing method was utilized to enlist the help of an unspecified number of workers. To facilitate effective data collection, an image collection tool called "GOODSGRAPHER" (trademark name) was developed and provided to the crowd workers. This tool enables them to easily acquire products that match the drawings, take photographs, and register the captured images for labeling tasks. The image collection tool "GOODSGRAPHER" was designed to integrate the process of collecting and verifying not only the drawing information corresponding to the design patent products but also the photographs obtained from capturing the patented products.

Meanwhile, to provide convenience to the crowd workers using GOODSGRAPHER, it is essential to give them detailed information about the design patents they need to collect. Therefore, drawing images of the design patents are provided along with design registration information obtained through API services from sources such as the Korean Intellectual Property Rights Information Service (KIPRIS). Crowd workers using GOODSGRAPHER secure real products based on the design patents product information and drawing images, photograph the products to match the composition of the design drawings, and upload the captured images to the server via GOODSGRAPHER. At this time, it is advisable to photograph the products against various backgrounds to enhance the diversity of the images. For example, the products should be photographed in different locations or with different background settings.

A data refinement process was necessary to perform the matching between the real products to be collected and the design patents drawings. The process involved verifying the alignment between the real products and the drawing images provided by the Korean Intellectual Property Rights Information Service (KIPRIS). Once this verification was completed, the drawing data was refined to exclude any images that made it difficult to identify the characteristics of the products.

The following describes the processing and augmentation of the collected data. This process includes a step of quantifying the collected data. For the acquired data, image augmentation was performed by randomly altering the brightness and hue, and applying Affine Transformations to store the quantified information.

Additionally, the acquired data was processed as follows: To ensure that the aspect ratio of the products remained unchanged, the photographed images were padded with a white background to make the width and height of the images equal, thus resizing the photographs.

Next, in the algorithm development phase, training is performed on the learning model using the processed data. The training dataset created through the collection and processing steps is divided into training, validation, and test datasets. An artificial neural network model is then introduced to train the training dataset. The inference algorithm operates to find the drawing image most similar to a specific product photograph when presented. After training is completed, the performance of the inference algorithm is evaluated according to predefined image retrieval performance metrics.

For training, a pre-trained artificial neural network model is required. An AI training framework such as PyTorch was utilized for the learning framework. CNN models such as ResNet and RexNet were selected as the neural network models for training, and pre-training was performed using datasets released by ImageNet and similar sources.

The selected CNN models were trained using the learning data established above. At this stage, there are separate models for training on real photograph images and for training on drawing images. Each model was modified to output feature vectors rather than classification results from the images.

During training, the data was divided into a training dataset, validation dataset, and test dataset. The training dataset is the data that the model actually learns from. The validation dataset is used to verify the model's performance after each training epoch. The test dataset is used to evaluate whether the model can generalize after the training is completed.

During training, when loading the training dataset, real product photograph images were used as 'Anchor images', drawing images matching the real photographs images as 'Positive images', and drawing images of other products as 'Negative images'. The training was conducted using a triplet loss function to ensure that the feature vectors of the real photograph images and the drawing images move closer together, while the feature vectors of the other drawing images move further apart. Simultaneously, to reduce the domain gap between the feature vectors of the real photograph images and the drawing images, each feature vector was distinguished through a discriminative model network structure, and the CNN model generating the feature vectors of the drawing images was trained through back-propagation to minimize the likelihood of incorrect classifications.

When training the model, a learning framework such as PyTorch was utilized, and early stopping was implemented. If the validation loss calculated at the end of each training epoch did not improve over a predefined number of epochs, the training was halted. If no stopping condition was met, the training continued for the predefined maximum number of epochs.

The evaluation of the artificial neural network model is conducted at the end of each training session. Drawing images to be retrieved are collected, and their feature vectors are generated and stored. Subsequently, feature vectors are created from product photographs that match the drawings, and the most similar drawing image feature vectors are retrieved, returning the top 10 results. At this time, the design registration numbers of the top 10 drawings are checked for matches with the design registration number of the real product, using the top 10 accuracy as a performance metric to evaluate the model's performance.

Next, the drawings provided by the Korean Intellectual Property Rights Information Service (KIPRIS) are converted into feature vector form using the CNN model applied to the drawing images and stored in a vector database. When a user captures a photograph of a product, the captured image is transformed into a feature vector using the CNN model applied to real photograph images. This feature vector is then compared with the feature vectors stored in the database to retrieve for the most similar drawings, returning the information of the top 10 drawings.

Next, in the phase of building the prediction and determination system, a similar drawing image retrieving model based on the acquired real photograph images was implemented. Using the aforementioned AI inference algorithm, the system was designed to return the most similar drawing for the product image captured by the user and provide this information to the intellectual property rights holder to verify potential infringement.

Next, I will explain the detailed contents of the present invention aimed at enhancing image retrieving performance.

Figure 3:
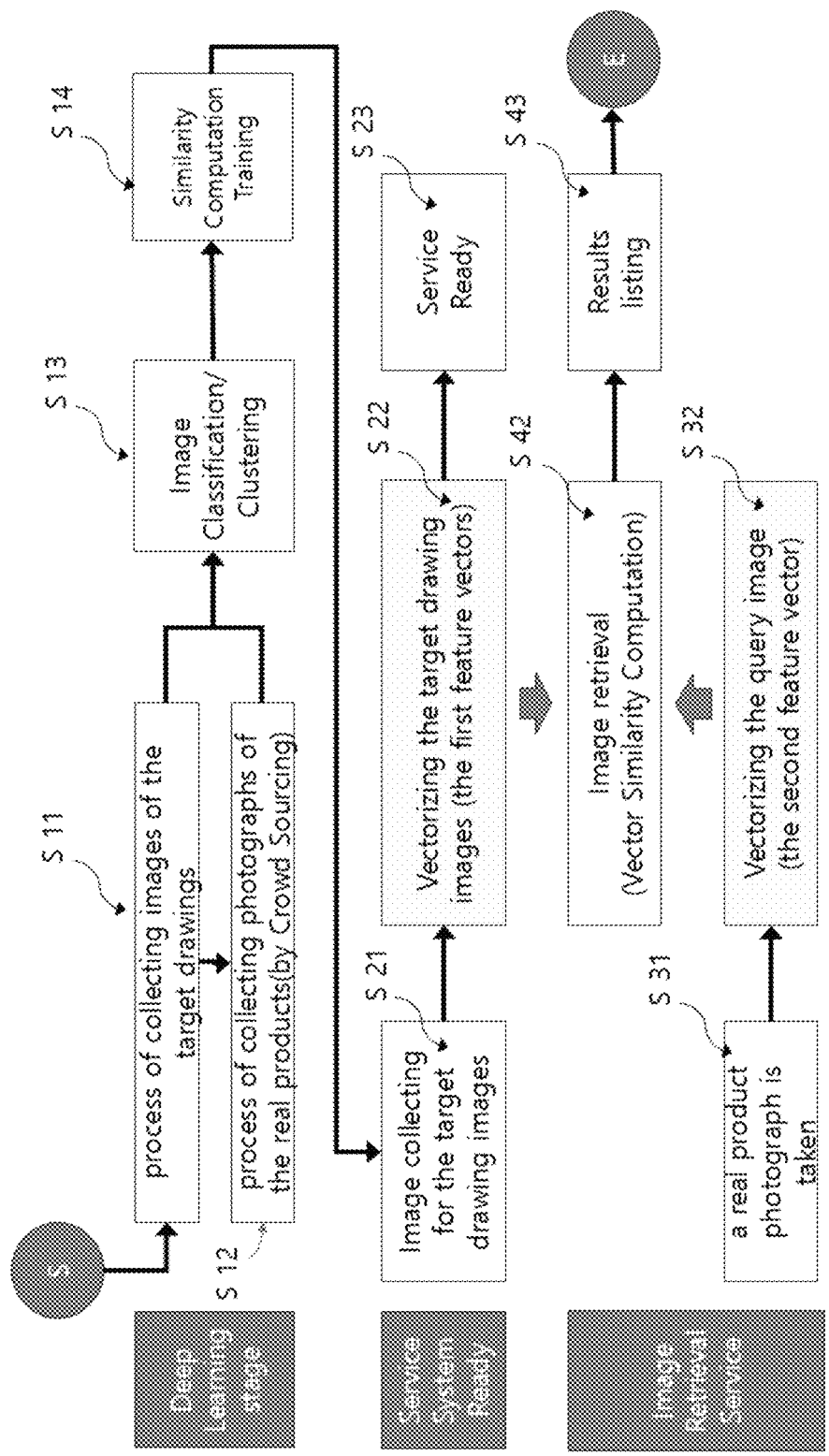
FIG. 3 is a conceptual diagram explaining the conventional image comparison retrieval method.

FIG. 3 is a diagram for explaining a conventional image retrieval system. As illustrated in the diagram, the stages that make up the retrieving system can be divided into the neural network model training stage, system configuration stage, and image retrieval stage. The training stage begins with the collection of training data, which consists of the process of collecting images of the target drawings S11 and the process of collecting photographs of the real products S12. The data collection process has been described earlier. In the image classification and clustering stage S13, The collected data should undergo refinement and augmentation processes, and it must be well classified based on factors such as the type of product, design patents, and image viewpoint. After that, as previously described, the similarity training S14 is conducted, and the training of the neural network model is completed.

Subsequently, the target images, such as the registered design patent drawing images registered with the Patent Office, are collected S21, and vector indexing is performed on these images S22. Vector indexing refers to the process of extracting feature vectors from the retrieving data drawing images, during which the neural network model completed through training, is used. The vectors created from the target images will be referred to here as the first feature vectors. Only then is the service preparation fully completed S23.

Once the system configuration is completed, when a real product photograph is taken using a dedicated mobile app and an image retrieval is attempted S31, the captured image is processed as a query image, and the same neural network mentioned earlier extracts the feature vector S32. This feature vector will be referred to as the second feature vector. The extracted second feature vector is then compared with multiple first feature vectors that have already been extracted and stored, and they are ranked based on the vector similarity computation method.

Figure 4:
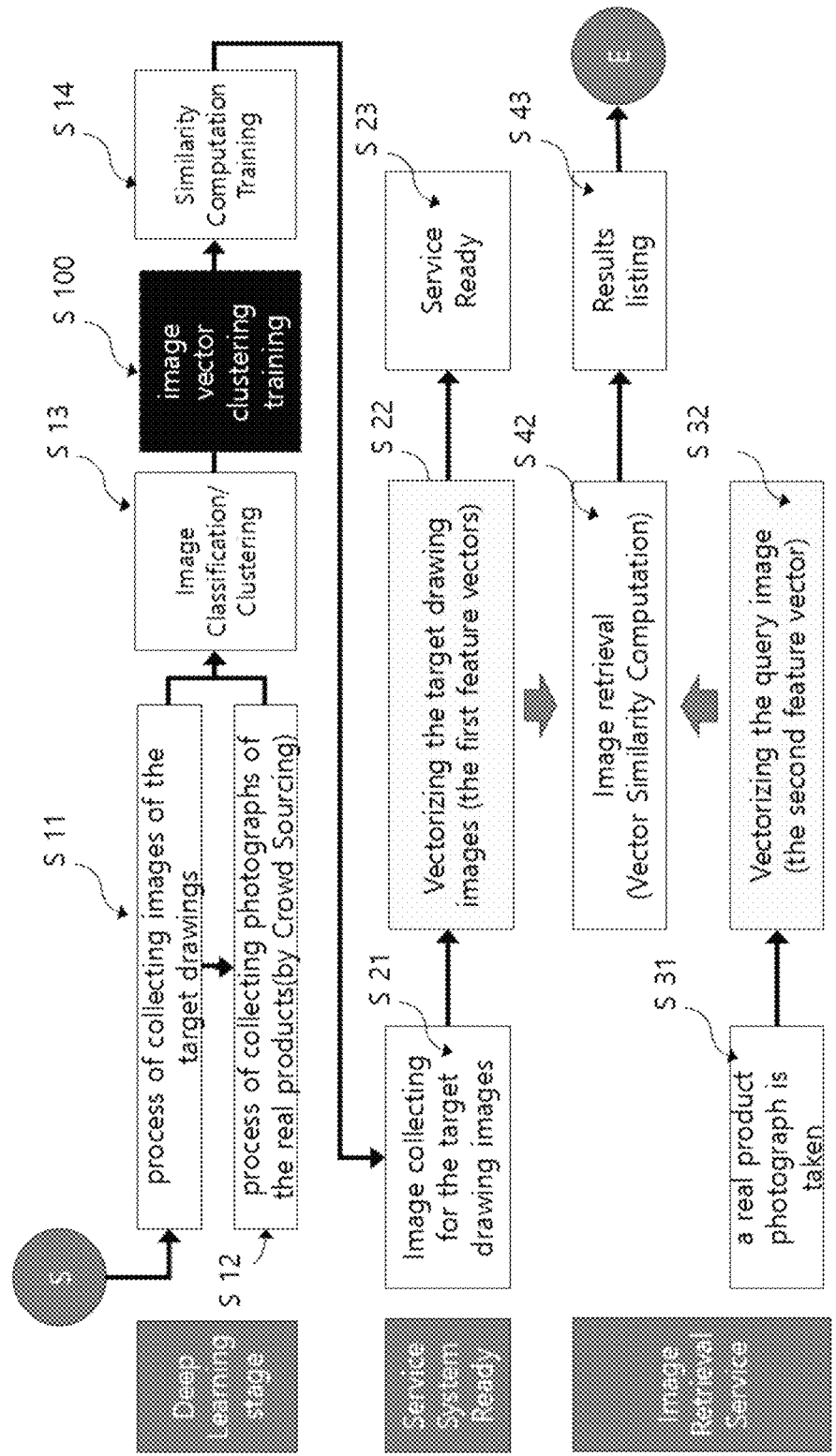
FIG. 4 is a conceptual diagram for explaining the differences between the image retrieval method of the present invention and the conventional image retrieval method.

FIG. 4 is a diagram for explaining the features of an embodiment according to the present invention. Compared to the conventional technology in FIG. 3, it includes the feature of the "image vector clustering training step S100." Image vector clustering can be considered as a method where images are grouped based on their shapes, as shown in FIG. 2, and then feature vectors are generated using a neural network model to distinguish them from other groups. However, in this approach, there are limitations in effectively reflecting the common characteristics of both drawing images and real product photograph images during the training process. The reason is that, as shown in FIG. 2, when clustering drawing images and real product photograph images into a single group, the images with different domain characteristics are mixed, resulting in the feature vectors not being clearly separated. As a result, the feature vector of an image included in one cluster becomes indistinguishable from the feature vectors extracted from images of other clusters.

Figure 5:
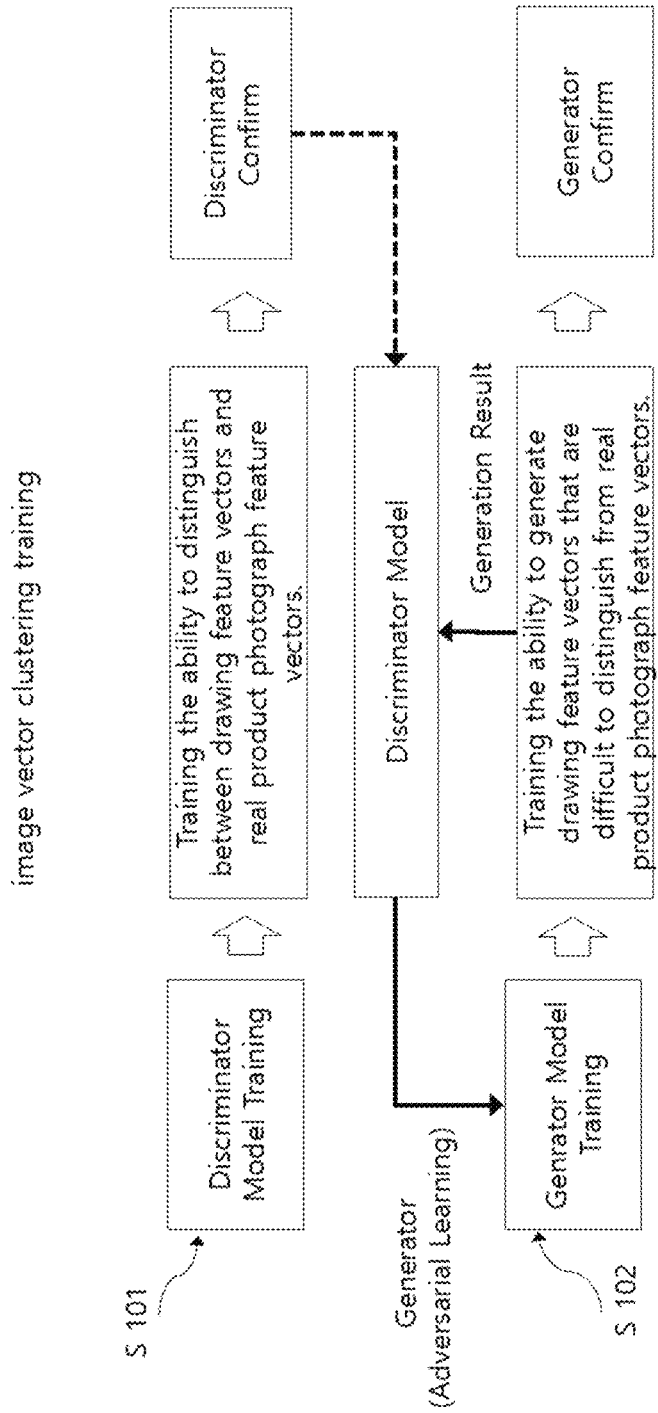
FIG. 5 is a conceptual diagram for explaining the feature of "image vector clustering training" in the image retrieval method of the present invention compared to conventional image retrieval methods.

FIG. 5 is a diagram for explaining the new "image vector clustering training method" presented as a solution to overcome the limitations of the conventional method. This method is constructed by applying adversarial learning techniques, utilizing models such as Generative Adversarial Networks (GAN).

The process consists of two stages: first, training the discriminator model to improve its performance, and second, training the generator model to secure its performance.

The training of the discriminator model is based on the dataset created as shown in FIG. 2, focusing on distinguishing the feature vectors of drawing images from those of real photograph images. It is important to note that this training involves distinguishing their feature vectors, not the images themselves. For the feature vectors generated from each type, the feature vector of the drawing images is labeled as '0,' while the feature vector of the real images is labeled as '1.' A large dataset is then used to train the model to differentiate the two feature vectors.

Once the training of the discriminator model is complete, the training of the generator model can proceed. The goal of the generator model is to continue training until the feature vector extracted from the drawing images becomes so similar to the feature vector extracted from the real photograph images that they are difficult to distinguish. The determination of whether the similarity is at a comparable level or indistinguishable is performed by the discriminator model. Thus, the discriminator and generator models learn in an adversarial relationship, and training is completed when the discriminator's evaluation results approach a 5:5 ratio, at which point it can be applied to the system.

Figure 6:
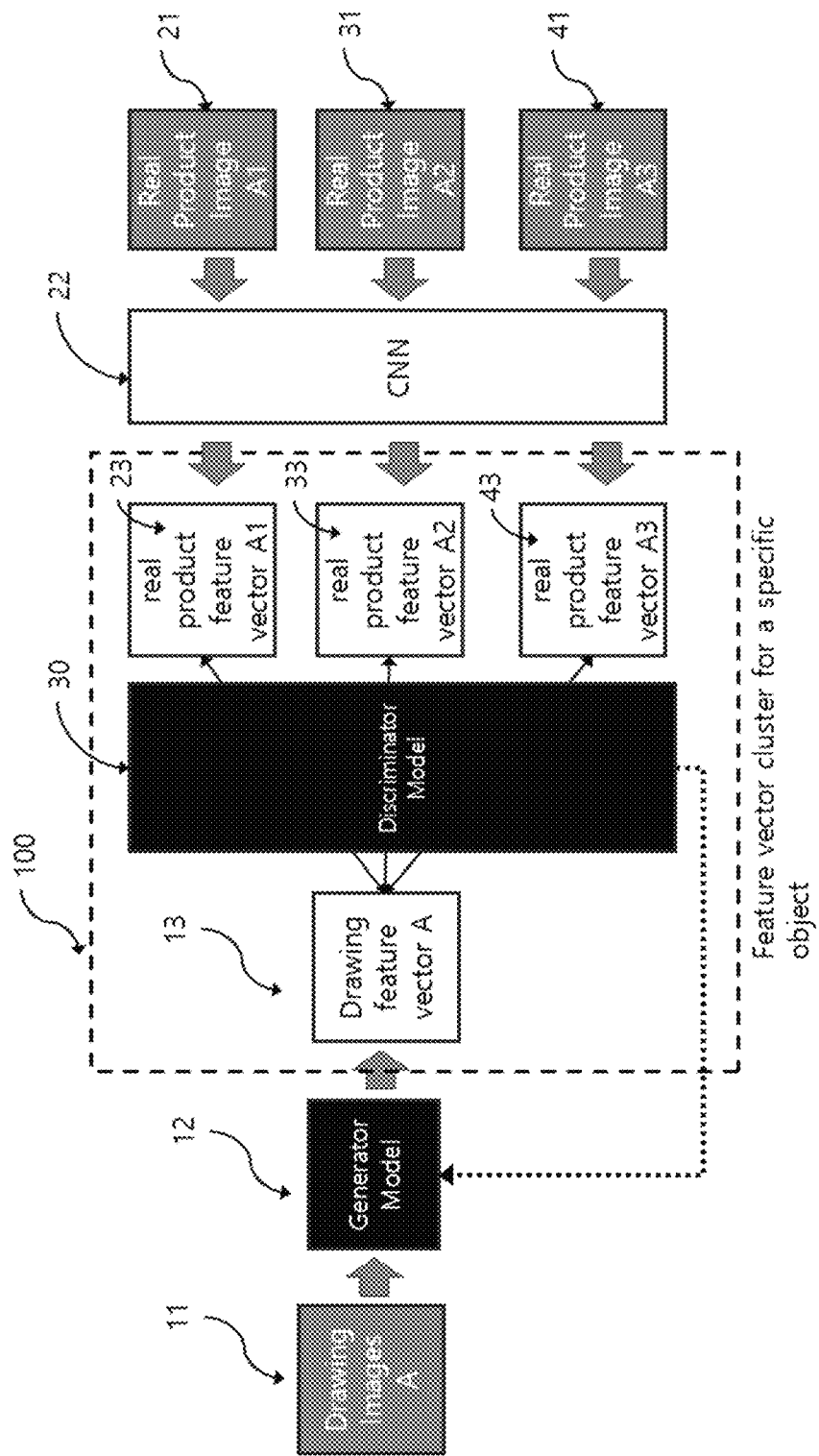
FIG. 6 is a schematic diagram illustrating the process of Generative Adversarial Learning (GAN) with the discriminator and generator models in an embodiment of the present invention.

FIG. 6 is a schematic diagram for explaining the configuration according to the present invention. As illustrated in the diagram, the drawing feature vectors 13 and real product image feature vectors 23, 33, 43 generated (extracted) from the design drawing images 11 and real product photographs images 21, 31, 41 are organized into a single feature vector cluster.

To achieve this, the drawing feature vectors 13 created by the generator model 12 must be similar enough in characteristics to the real product image feature vectors 23, 33, 43 produced by the convolutional neural network 22 to be considered part of the same cluster. The discriminator model 30 continues its discrimination process until the drawing feature vectors 13 generated by the generator model 12 are similar enough to the real product image feature vectors 23, 33, 43 produced by the convolutional neural network 22 that distinguishing between them becomes difficult. Meanwhile, the generator model 12 generates drawing feature vectors 13 that possess similar characteristics to those required for the same cluster until the discriminator model 30 can no longer differentiate between the characteristics.

As a result, the feature vectors 13, 23, 33, 43 of the feature vector cluster 100 can be represented as the characteristic vectors that represent the cluster. When a photograph of a real object is provided as a query image, the similarity is calculated between the extracted feature vector from the query image and the nearby feature vectors found. Among these, the design drawing images corresponding to the real product photograph images are bound to be ranked highly in the retrieving results.

The configuration of the present invention has been described in detail above. The following are specific application examples of the learning system constructed in this invention.

First, it can be used to detect illegal counterfeit products that infringe on design patent. For products passing through customs, it is necessary to determine whether there is an infringement of intellectual property rights. This system allows for easy assessment of suspected illegal reproduction of products centered around design patent, notifying the rights holder, ultimately enabling control over the clearance of suspected infringing products.

Next, through monitoring and removing suspected intellectual property rights products, a clean shopping mall certification can be achieved. Open markets, where sellers register their products, can have numerous intellectual property infringement products listed, which can undermine the credibility of the marketplace and infringe on the rights of consumers and intellectual property rights holders, potentially leading to substantial liability for damages for the marketplace. By registering and monitoring the actual images of products listed in open markets, suspected intellectual property infringement products can be filtered and registration can be controlled, thereby enhancing the marketplace's credibility and protecting the rights of consumers and rights holders. Shopping malls that adopt such a system can improve the reliability of the products sold and enhance their competitiveness.

Additionally, during the invention, application, examination, and registration stages of design patents, patents, and trademarks, information on previously registered or filed design patents can be retrieved using image queries. By retrieving the drawing information of such patent information, the likelihood of new patent registration can be increased, and conflicts with existing registered patent information can be avoided. Moreover, by retrieving the drawing information and actual images of products intended for release with the drawings of already registered patent information, the possibility of infringing on registered patent information can be prevented.

Additionally, it can be applied to the reading of HS codes and item classification. A critical area in trade is determining customs tariffs, which relies on the product's HS code. The HS code is an essential element that must be recorded and assigned during the customs process for importing and exporting products. However, Significant effort is required to determine, assign, and verify these HS codes.

A system can be established that trains the drawing and image information of products with HS codes and compares it with the image information of items requiring customs clearance to read similar HS codes. By doing so, the efficiency of the processes involved in assigning, recording, and determining HS codes can be improved, leading to an increase in customs revenue The present invention provides a method for collecting training data to ensure that photographs collected match the composition of the corresponding design drawings. A crowd worker data collection tool was developed to facilitate this process, and the collected images of real products are labeled with design registration numbers and compositional information during the data processing stage. The processed data, consisting of both real product images and drawing images along with their respective labels, is then used as a training dataset for neural network learning.

To reduce the domain gap between real product photograph images and drawing images during training, a discriminator network structure is added to classify the domains of the feature vectors generated from each image. This enables the convolutional neural network that generates the feature vectors from the drawing images to produce vectors that are similar to those generated from the real photograph images through generative adversarial learning. This approach provides a method for retrieving similar images across different domains by calculating the similarity between the input real photograph image and the registered drawing images to infer the most similar drawing.

Additionally, the technology of the present invention can be applied to retrieve for already registered rights during the application for patents and intellectual property, monitor and retrieve suspected intellectual property infringement products, and infer similarities. It can also be used for purposes such as inferring part numbers from drawings when the part numbers of owned products (e.g., used automotive parts) are unknown, facilitating the procurement of parts.

In particular, according to the present invention, it is preferable not to collect drawings that do not reveal the visual characteristics of the product (e.g., instructional drawings) or product photographs that are arranged in a way that does not correspond to the layout of the drawings during the training data collection phase.

Furthermore, according to the present invention, when collecting real photograph images of products during the training data collection phase, it is preferable to capture the same product against various backgrounds to gather a diverse set of real product images.

Furthermore, according to the present invention, it is preferable to include a preprocessing step that performs image processing, such as brightness and hue adjustments, size changes, and Affine Transformations, on the images collected during the training data collection phase. This will allow for the augmentation of the training data Moreover, in the learning stage of the training data, it is preferable for the learning model to select CNN and conduct classification learning using a large volume of well-classified training data, followed by deep learning based on this training data.

In addition, the learning model in the training data learning stage should include adversarial learning, where the discriminator network structure determines from which domain the feature vectors generated from real product photograph images and drawing images originate, and conducts adversarial learning so that the feature vectors cannot be distinguished Furthermore, the present invention allows for the acquisition of a large number of images representing the same object but having different domains, generating feature vectors from them, and grouping them into a single cluster group. After securing many feature vectors from other clusters, training is conducted to enhance the ability to distinguish between feature vectors belonging to one cluster and those belonging to another. This training enhances the ability to assess similarity among images with different domain characteristics within the same cluster.

At this point, setting the image vector cluster as a triplet learning dataset allows for conducting similarity training on images that generate feature vectors within the same cluster. As a result, even when the domains differ, the images that generate feature vectors within the same cluster can be judged as identical, while learning the distinction from other clusters.

In conclusion, the artificial intelligence can reduce the domain gap between real photograph images and drawing images, enabling the retrieving and verification of similar drawing images from real photograph images.

By providing this invention, it becomes possible to enhance the AI's ability to assess similarity between the drawings attached to design patent applications and the real product images representing the implemented design. As a result, the time and cost involved in intellectual property applications can be reduced, and the examination process can be conducted more efficiently, promoting the application and registration of intellectual property rights. This contributes to industrial development, effectively filters and controls infringing products, and increases global reliability in design protection.

What is claimed is:

1. An image retrieving method comprising the following steps:
- a first step of generating a feature vector database for multiple target drawing images, where each image is processed by a first convolutional neural network (CNN) to create target feature vectors,
- a second step of generating a query feature vector from a real-world photograph obtained by capturing a real object using a second convolutional neural network,
- a third step of retrieving the target feature vector database for vectors most similar to the query feature vector generated from the query image,
- the method including a generative model that creates a feature vector from a specific drawing image and a discriminative model that identifies differences between the feature vector extracted from the specific design drawing and those feature vectors extracted from real product images,
- the generative model further iteratively adjusting the generation of the feature vector until the discriminative model finds it challenging to distinguish the generated feature vector from other feature vectors within the same cluster group,
- the discriminative model undergoes adversarial training to maximize its ability to distinguish feature vectors extracted from multiple design drawing images from those feature vectors extracted from real product images of the items represented by the drawings,
- the method further includes an additional feature vector generation step to create feature vectors for the same cluster group as a result of the adversarial training, enhancing the accuracy of similarity comparisons between drawing images and real product images.

2. The method of claim 1,
further comprising an image vector clustering training step wherein feature vectors are generated from images representing the same object but having different domains and grouped into a single identical cluster group,
wherein, within this cluster group, the training is conducted to enhance the similarity among the feature vectors included, while training is also conducted to increase the distinction between the feature vectors belonging to different cluster groups.

3. The method of claim 2,
wherein the image vector clustering training step is set as a triplet learning dataset based on the image vector clusters, and the training first executes similarity judgment learning to determine that images generating feature vectors within the same cluster represent the same object, even if their domains differ, and, subsequently, the training executes discrimination learning to establish that the feature vectors belonging to different cluster groups represent different objects.

4. The method of any one of claim 1,
wherein the design drawing image is a drawing image attached to a design rights application.

5. The method of any one of claim 4,
wherein the real product photograph query image is a real product photograph image obtained by capturing a product that is in the customs clearance process.

* * * * *